(12) United States Patent
Moyeda et al.

(10) Patent No.: US 8,501,131 B2
(45) Date of Patent: Aug. 6, 2013

(54) METHOD AND APPARATUS TO INJECT REAGENT IN SNCR/SCR EMISSION SYSTEM FOR BOILER

(75) Inventors: David Kelly Moyeda, Santa Ana, CA (US); Wei Zhou, Santa Ana, CA (US); Antonio Marquez, Irvine, CA (US); Xu Guang, Santa Ana, CA (US); Santosh Nareddy, Irvine, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/327,121

(22) Filed: Dec. 15, 2011

(65) Prior Publication Data

US 2013/0156671 A1 Jun. 20, 2013

(51) Int. Cl.
   *B01D 53/56* (2006.01)
   *B01D 53/74* (2006.01)
   *B01D 53/79* (2006.01)
   *B05D 7/04* (2006.01)
   *F23D 11/38* (2006.01)

(52) U.S. Cl.
   USPC ........ 423/235; 423/239.1; 422/168; 422/169; 422/170; 422/172; 422/177; 239/8; 239/398

(58) Field of Classification Search
   USPC ............... 423/235, 239.1; 422/168–170, 172, 422/177; 239/8, 398
   See application file for complete search history.

(56) References Cited

U.S. PATENT DOCUMENTS

| | | | |
|---|---|---|---|
| 4,572,903 A * | 2/1986 | Hino et al. ........... 502/55 |
| 4,985,218 A | 1/1991 | DeVita | |
| 5,139,754 A * | 8/1992 | Luftglass et al. ........... 423/235 |
| 5,286,467 A * | 2/1994 | Sun et al. ........... 423/239.1 |
| 5,344,628 A * | 9/1994 | Martin ........... 423/235 |
| 6,146,605 A | 11/2000 | Spokoyny | |
| 6,474,271 B1 * | 11/2002 | Widmer et al. ........... 122/405 |
| 6,615,507 B2 | 9/2003 | Ruscheweyh et al. | |
| 6,779,786 B2 | 8/2004 | Ruscheweyh et al. | |
| 6,986,658 B2 | 1/2006 | Stephens et al. | |

(Continued)

FOREIGN PATENT DOCUMENTS

| DE | 102010020277 | 11/2011 |
|---|---|---|
| EP | 1166861 B1 | 3/2003 |

(Continued)

OTHER PUBLICATIONS

Chen, L. "Improvement on Hybrid SNCR-SCR Process for NO Control: a Bench Scale Experiment," Chen, Aerosol and Air Quality Research, vol. 6, No. 1, pp. 30-42, 2006.

(Continued)

*Primary Examiner* — Timothy Vanoy
(74) *Attorney, Agent, or Firm* — Nixon & Vanderhye P.C.

(57) ABSTRACT

An apparatus to introduce a reagent to reduce nitrogen oxides in flue gas including: nozzles mounted to a passage for the flue gas, wherein the nozzles are mounted downstream of a SNCR system and upstream of a SCR system, wherein the nozzles are mounted on one or more walls of the passage and are configured to inject a pressurized fluid into the flue gas; a source of the pressurized fluid which is in fluid communication with the nozzles such that the pressurized fluid flows to the nozzles; a source of a NOx reducing reagent and a mixing device which mixes the reagent with the pressurized fluid such that the pressurized fluid flowing to the nozzles includes the reagent.

22 Claims, 4 Drawing Sheets

U.S. PATENT DOCUMENTS

| | | | |
|---|---|---|---|
| 7,332,143 B2 * | 2/2008 | Symrniotis et al. | 423/239.1 |
| 7,374,736 B2 | 5/2008 | Payne et al. | |
| 7,438,464 B2 | 10/2008 | Moser et al. | |
| 7,776,279 B2 | 8/2010 | Payne et al. | |
| 7,784,262 B2 | 8/2010 | Leser et al. | |
| 8,010,236 B2 | 8/2011 | Jambhekar et al. | |
| 8,066,424 B2 | 11/2011 | Ruscheweyh et al. | |
| 2004/0201142 A1 | 10/2004 | Rumen | |

FOREIGN PATENT DOCUMENTS

| | | |
|---|---|---|
| EP | 2 151 272 | 2/2010 |
| JP | 2006-198615 | 8/2006 |
| KR | 20090084055 A | 8/2009 |
| WO | 9741947 | 11/1997 |
| WO | 2004-105928 A2 | 12/2004 |

OTHER PUBLICATIONS

Rowlan, S. J.; Sun, W. H.; Cardinal, T.; Stamatakis, P. "NOx Control on Preheat and Radiant Furnaces at Nucor Steel Mills through Urea SNCR, SCR, and Hybrid Processes," To Be Presented at ICAC Forum '02: Cutting NOx, Feb. 12-13, 2002, Houston, Texas, 10 pages.

Dean, W. "Insitu Analysis of Ammonia Slip and Water Vapor Using a Tunable Diode Laser for SCR/SNCR Optimization and Boiler Tube Surveillance in Power Plants," 49th Annual ISA Analysis Division Symposium, AD 2004, Apr. 18-22, 2004, Clarksville, Indiana, pp. 74-84.

Albanese, V.; Boyle, J.; Huhmann, A.; Wallace, A. "Evaluation of Hybrid SNCR/SCR for NOx Abatement on a Utility Boiler," Fuel Tech, Inc., Technical Papers, TPP 522, http://www.ftek.com/en-US/library/technical-papers/, pre-filing date, 6 pages.

The Natural Gas Boiler Burner Consortium, "Flue Gas Treatment Controls," from the Reduction and Controls Technologies section of the Boiler Burner Workshop web site edition, available circa 2004, 10 pages.

Albanese, V.; Boyle, J.; Sun, W.; Abrams, R. "Hybridization of Urea-SNCR with SCR A Fit for the Future," Presented at ICAC's Clean Air Technologies & Strategies Conference, Baltimore, Maryland, Mar. 7-10, 2005, 18 pages.

Lehigh Univ., "SCR and SNCR Processes Increase Risk of Air Preheater Fouling," Lehigh Energy Update, vol. 19 (2), Jun. 2001, 3 pages.

Flow.Vision, deNOx division of FlowVision-Energy A/S, "SNCR DeNOx Technology," SNCR technology and systems overview, copyrighted 2008-2010, 4 pages.

Sansone, R. J., "Risk Mitigation and SCR/SNCR: Compatible or Mutually Exclusive?" Presentation Slides, Presented to the 2002 DOE Conference on SCR & SNCR for NOx Control, 2002, 16 pages.

Pfaff, D.; Abrams, R. "Hybrid SNCR/In-Duct SCR System," Presentation Slides, Environmental Controls Conference, Pittsburgh, Penn., May 16-18, 2006, 21 pages.

Balcke-Durr GmbH, "SCR Technology from Balcke-Durr—Delta Wing," Presentation Slides, May 23, 2007, 19 pages.

PCT/US2012/069498 (Search Report) (Apr. 5, 2013).

"Cost-Efficient Nitrogen Oxides Control by a Hybrid Selective Noncatalytic Reduction and Selective Catalytic Reduction System on a Utility Boiler", XP-002693916, vol. 28, No. 5, May 2011.

* cited by examiner

US 8,501,131 B2

METHOD AND APPARATUS TO INJECT REAGENT IN SNCR/SCR EMISSION SYSTEM FOR BOILER

BACKGROUND OF THE INVENTION

The invention relates to emissions control for a boiler and particularly to suppressing emissions of nitrogen oxides in flue gasses generated by a boiler.

Flue gas generated from combustion of fossil fuels such as oil, gas and coal typically include airborne nitrogen oxides ($NO_x$). NOx are pollutants and subject to increasingly strict governmental regulations to protect the atmospheric environment. There is a long felt need for systems to reduce NOx in flue gas.

To reduce the nitrogen oxides in flue gas, various systems are deployed in the flue gas passages of the boiler. These conventional systems include selective catalytic reduction (SCR) and selective noncatalytic reduction (SNCR) which both react reagents with the flue gas. The reagents, such as ammonia and urea, react with nitrogen oxides in the flue gas to remove NOx from the flue gas.

SNCR involves the injection of a reagent in hot flue gas. The heat in the flue gas promotes a chemical reaction between the reagent and NOx to reduce the NOx in the gas. SCR also involves a reagent reacting with flue gas, but is performed on cooler flue gas. As gas cools, the flue gas passes through the SCR system which has a catalyst to promote the chemical reaction between the reagent and NOx and thereby further reduce NOx in the gas. The catalyst is typically on a supporting structure positioned in the path of the flue gas. In a SNCR/SCR coupling system, the reagent used for the SCR system can be a portion of the reagent introduced by the SNCR system. The portion is the remaining reagent that did not react with the NOx in the SNCR system. The remaining reagent flows with the flue gas to the SCR system. The remaining reagent is often referred to as "ammonia slip" from the SNCR system.

A uniform distribution of the reagent remaining in the flue gas is desirable as the gas passes over the catalyst in the SCR system. Structural or mechanical mixing devices, such as arrays of plates, have been positioned in the flue gas upstream of the SCR system to ensure that the reagent is uniformly distributed in the flue gas.

SUMMARY OF INVENTION

A system and method has been conceived and invented to uniformly distribute a reagent in flue gas passing through a SCR system. A reagent and steam mixture is injected in the flue gas upstream of the SCR system and downstream of the SNCR system. The steam and reagent mixture is injected at a high velocity and through an array of nozzles to ensure vigorous mixing with the flue gas. The array of nozzles may be arranged on the walls of the passage for the flue gas to ensure uniform distribution of the reagent as the flue gas passes through the SCR system.

An apparatus has been conceived to introduce a reagent to reduce nitrogen oxides in flue gas including: nozzles mounted to a passage for the flue gas, wherein the nozzles are mounted downstream of a SNCR system and upstream of a SCR system, wherein the nozzles are mounted on one or more walls of the passage and are configured to inject a pressurized fluid into the flue gas; a source of the pressurized fluid which is in fluid communication with the nozzles such that the pressurized fluid flows to the nozzles; a source of a NOx reducing reagent and a mixing device which mixes the reagent with the pressurized fluid such that the pressurized fluid flowing to the nozzles includes the reagent.

A method has been conceived to reduce airborne nitrogen oxides (NOx) in combustion gas comprising: generating combustion gas and directing the flow of combustion gas through a passage; reducing the airborne NOx in the combustion gas by injecting a NOx reducing reagent in the combustion gas flowing through the passage, wherein heat energy in the combustion gas promotes a chemical reaction between the reducing reagent and the NOx; injecting into the passage, downstream of the injection of the NOx reducing reagent, a mixture of steam or other high speed medium and the NOx reducing reagent through an array of nozzles arranged on one or more sides of the passage; further reducing the airborne NOx in the combustion gas by using a catalyst to promoting a reaction between combustion gas and the NOx reducing reagent injected with the steam.

BRIEF DESCRIPTION OF THE INVENTION

The structure, operation and features of the invention are further described below and illustrated in the accompanying drawings which are:

Figure 5:
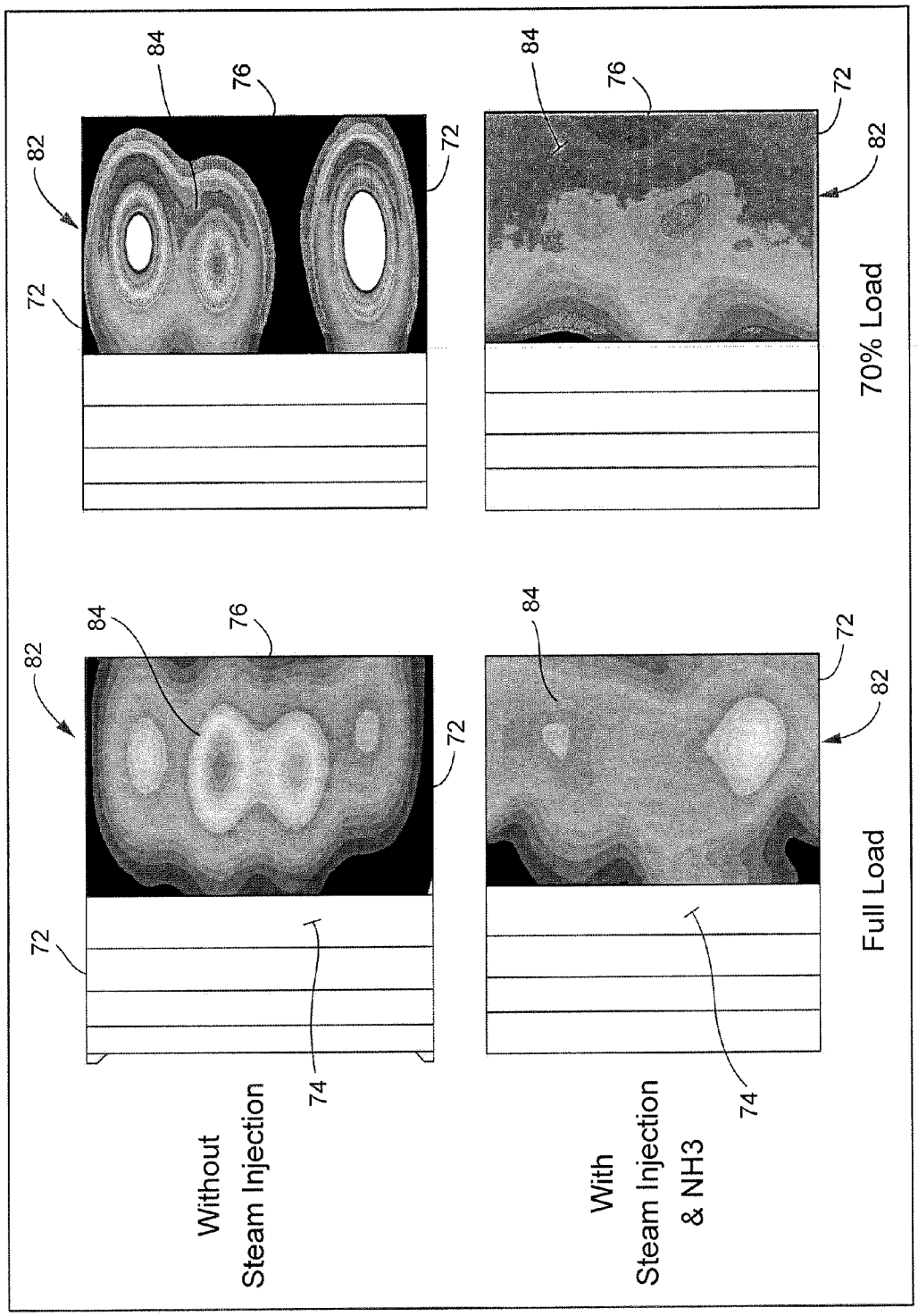

FIG. 5 presents computer generated cross-sectional images of the flue gas (with and without the steam and reagent flow) at a position corresponding to the location of SCR system.

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
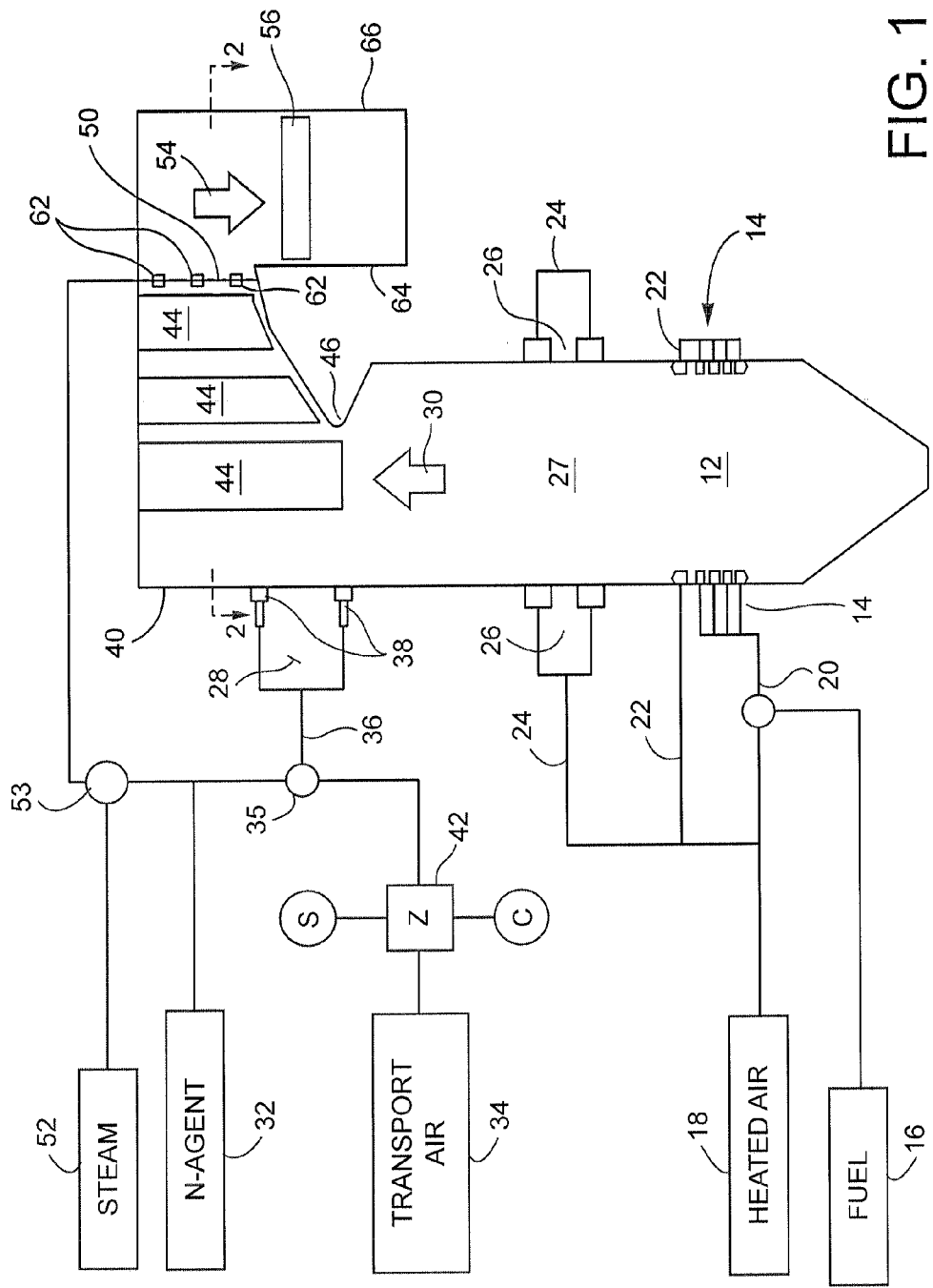
FIG. 1 shows schematically a boiler having SNCR and SCR emission control systems.

FIG. 1 is a schematic representation of an exemplary boiler 10 that reduces NOx emissions using SNCR and SCR techniques to inject a NOx reducing reagent in the flue gas generated by the boiler.

Burners 14 inject fuel and air into the combustion zone. The fuel may be coal, oil, natural gas or other fossilized organic material supplied from a fuel source 16. The source of heating air 18 may be blowers or fans directing air into the burners. The air may flow as primary combustion air (see conduit 18) with the fuel and into the burner. The air source 18 may also provide secondary combustion air which flows through combustion air duct 22 and is injected through nozzles into the combustion zone 12. The burners and nozzles are arranged on the wall of the boiler. The air source may also provide overfire air through an overfire air duct 24 to overfire air nozzles 26.

The combustion gases formed by the combustion of air and fuel flow through and are contained by a passage 27, e.g., duct, extending through the boiler. The passage 27 may initially extend vertically upward as shown in FIG. 1.

An SNCR system 28 injects the NOx reducing reagent into a high gas temperature region (see arrow 30) of the flue gas passage 12. The reagent is supplied from a source 32 and mixed via mixer 35 with a pressurized transport air 34 to move the N-agent through a header 36 to reagent injection nozzles 38 arranged on the walls 40 of the boiler. The nozzles 38 may be arranged with the overfire air nozzles 26 or at another elevation in the passage 12.

The transport air 34 assists in moving the N-agent through the header 36 and the nozzles 38. The transport air may be pressurized sufficiently to achieve a desired spray pattern from the nozzles 38. The transport air may also be heated in a heat exchanger 42 which transfers heat from steam (S) and discharges condensate (C). Further the reagent may be, for example, ammonia ($NH_3$) or urea ($CO(NH_2)_2$).

The nozzles 38 for the SNCR system may be positioned to inject the reagent where the flue gas is in a selected temperature range. The temperature ranges for the hot flue gas (see arrow 30) to receive the reagent may be a range of 1650 to 2,000 degrees Fahrenheit (900° C. to 1100° C.). The reagent may be injected in a gas phase or in a liquid phase. If in a liquid phase, the reagent may be sprayed from the nozzles as small droplets that rapidly evaporate in the hot flue gas.

The amount of reagent injected by the SNCR system may be sufficient such that some of the reagent does not react with the NOx in the hot flue gas. A portion of the reagent may remain unreacted and flow with the flue gas further downstream in the passage 27 of the boiler. This unreacted portion of the reagent may further react with the NOx in the flue gas as the gas flows through the SCR system. In this approach, a portion of the reagent for the SCR system will be unreacted reagent injected with the SNCR system and another portion will be reagent injected with steam and downstream of the SNCR system.

Alternatively, the amount of reagent injected with the SNCR system may be minimized such that substantially all of the reagent is reacted by the hot flue gas and relatively little reagent remains unreacted as the flue gas cools to below the hot temperatures needed to promote the reactions in the absence of a catalyst. In this alternative approach, all or nearly all of the reagent needed for the SCR system is injected in the flue gas downstream of the SNCR system.

The term reagent is used to refer to any of a variety of chemical species capable of selectively reducing NOx in the presence of oxygen in flue gas or other combustion gas. Reagents include urea, ammonia, cyanuric acid, hydrazine, thanolamine, biuret, triuret, ammelide, ammonium salts of organic acids, ammonium salts of inorganic acids, and the like. Specific examples of ammonium salt reagents include ammonium sulfate, ammonium bisulfate, ammonium bisulfite, ammonium formate, ammonium carbonate, ammonium bicarbonate, and the like. Mixtures of these reagents may be used. The reagent may be provided in a solution as a gas.

The flue gas may pass through one or more convective pass pendants 44, e.g., heat exchangers. The transfer of heat energy cools the gases as they flow through the conductive pass pendants. These conductive pass pendants transfer heat energy from the flue gas to form steam or superheated steam. The temperature of the flue gas may cool from above 1700 degrees Fahrenheit (930° C.) to below 1100 degrees Fahrenheit (590° C.).

The passage 27 may turn from generally vertical to horizontal in the region containing the conductive pass pendants 44. As it turns from vertical to horizontal, the passage may have a nose 46 which extends into the passage and forms a bottom of the region of the passage having the conductive pass pendants 44. The cross-sectional shape of the passage 27 may be generally rectangular. The cross-sectional shape may not be uniform and may change as the passage turns from vertical to horizontal and back to vertical.

The presence of conductive pass pendants 44 in the passage 27, the variations in the cross-sectional shape of the passage and the turning of the passage can cause the flow of flue gas to be complex and non-uniform. The distribution of residual reagent, e.g., the ammonia slip, in the flue gas may be similarly non-uniform.

An array 50 of steam injection nozzles 62 is positioned on the walls of the passage 27. The nozzles inject a mixture of steam 52 and the nitrogen oxides reducing reagent 32. The steam and reagent may mix at a mixing device such as static mixer 53 that injects reagent into the duct supplying steam to the nozzles 62. The injected steam and reagent mixture creates turbulence and vigorous mixing of the flue gas downstream of the conductive pass pendants 44. Further, the injection of reagent with the steam ensures a uniform distribution of the reagent in the flue gas (see arrow 54) flowing to the SCR system 56.

The array 50 of steam and reagent injection nozzles 62 is in the passage 27 and between the SNCR system 28 and the SCR system 56. The array of nozzles 62 may be positioned in the passage 27 between the downstream end of the conductive pass pendants 44 and the upstream end of the SCR system 56.

Between the array 60 of nozzles 62 and the SCR system 56 the passage 27 may be substantially free of obstructions and need not have mechanical mixing devices, such as arrays of plates or vanes. The mixing of the flue gas provided by conventional mechanical mixing devices is achieved by the injection of steam and reagent through the nozzles 62.

The SCR system 56 may be conventional and include a grid or other matrix coated with a catalyst which promotes the reaction between the reagent and the remaining NOx in the flue gas. The grid is arranged in the flow path of the flue gas 54 and mounted to the interior walls of the boiler. The flue gas flowing over the SCR system by at relatively low temperatures such as 300 degrees to 900 degrees Fahrenheit (150° C. to 485° C.). The reagent should be uniformly mixed with the flue gas to ensure that the catalyst in the SCR system effectively promotes the reaction between the reagent and NOx.

Figure 2:
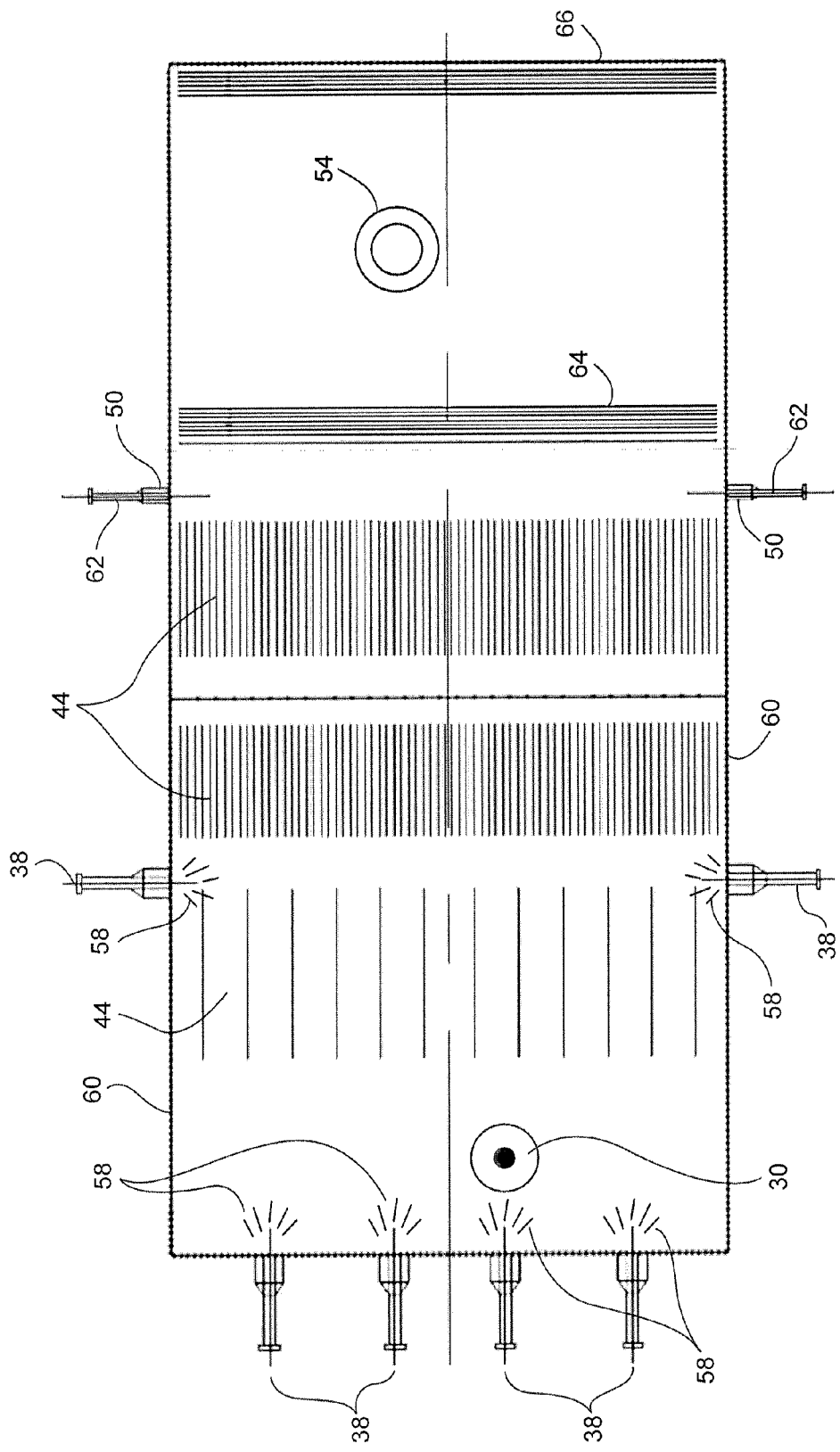
FIG. 2 shows schematically a cross-sectional view of the boiler taken along line 2-2 in FIG. 1.

FIG. 2 is a cross-section of taken along line 2-2 in FIG. 1. FIG. 2 is a top down view of the inside of the boiler 10 and particularly the upper portion of the boiler which contain the conductive pass pendants 44, illustrated a parallel lines representing the fins of the conductive pass pendants. The upward flowing (arrow 30) of the hot flue gas is shown as it moves up past the nozzles 38 for the SNCR system. These nozzles 38 inject the reagent and transport air mixture as a spray 58 into the flue gas. The nozzles are mounted to the walls of the passage for flue gas and are upstream of the conductive pass pendants. The nozzles 38 on the sidewalls 60 are at a lower elevation than the most upstream conductive pass pendants 44.

The array 50 of nozzles 62 to inject steam may be arranged on opposite sidewalls 60. The nozzles may also be mounted on other walls of the passage, such as the backpass front 64 and back 66 walls of the downwardly extending portion of the passage 27, or even the top wall (roof) of the passage. The array 50 of steam and reagent injection nozzles may be formed of a vertical column of nozzles, such as three, arranged immediately downstream of the last conductive pass pendant 44 in the passage 27. The nozzles on opposite sides of the walls 60 may be vertically offset from each other such that the injected steam and reagent mixture form interleaved streams entering transversely to the flue gas.

The array 50 nozzles to inject the mixture of steam and reagent inject may inject the mixture at high velocities, such as near sonic speeds. For example, the injection velocity may be 350 to 450 meters per second (m/s) or 375 m/s to 400 m/s. Similarly, the velocity may have a Mach Number of at least 0.5 or in a range of 0.65 to 0.75. To achieve these injection velocities, the steam 52 used to transport the reagent and induce turbulence in the flue gas may be under a pressure of 1.0 to 1.5 megapascals (MPa), a velocity head of 28 to 35 kilopascals (kPa) and the nozzles 62 may have a throat diameter of 30 to 33 millimeters (mm). Further, the total injection (steam and reagent) flow rate may be at or below one percent (1%) of the flow rate of the flue gas in the passage 27. the temperature of the steam may be superheated, such as in a range of 300 to 350 degrees Celsius.

As an alternative to steam injection, the reagent may be injected with a transport air. In this alternative, the array 50 of injection nozzles 62 are air injection nozzles and the transport medium is air rather than the transport steam 52. The air transport medium may be injected at a relatively low velocity such as 300 feet per second (100 meters per second). The reagent may be in gas form if injected with an air transport medium. The total flow rate of the transport air and reagent may be about five percent (5%) of the flow rate of the flue gas, or in a range of 3% to 7%.

Figure 4:
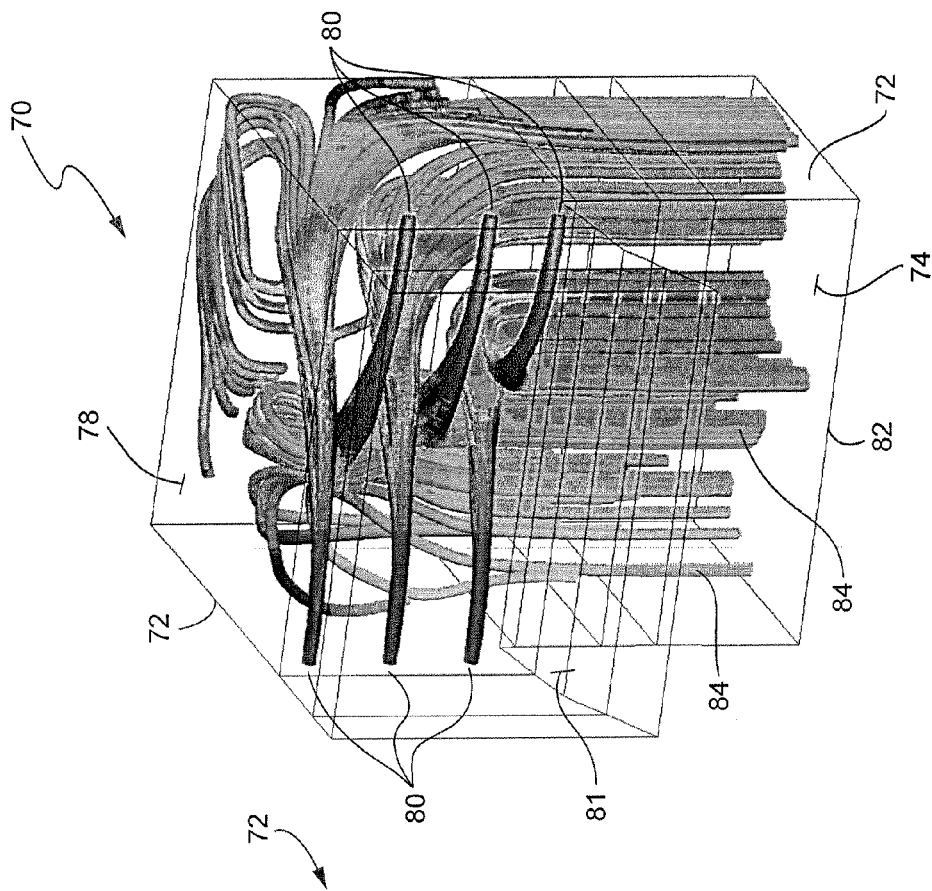
FIGS. 3 and 4 are perspective views of a computer generated model of the injection of steam and reagent into a virtual passage for flue gasses.
Figure 3:
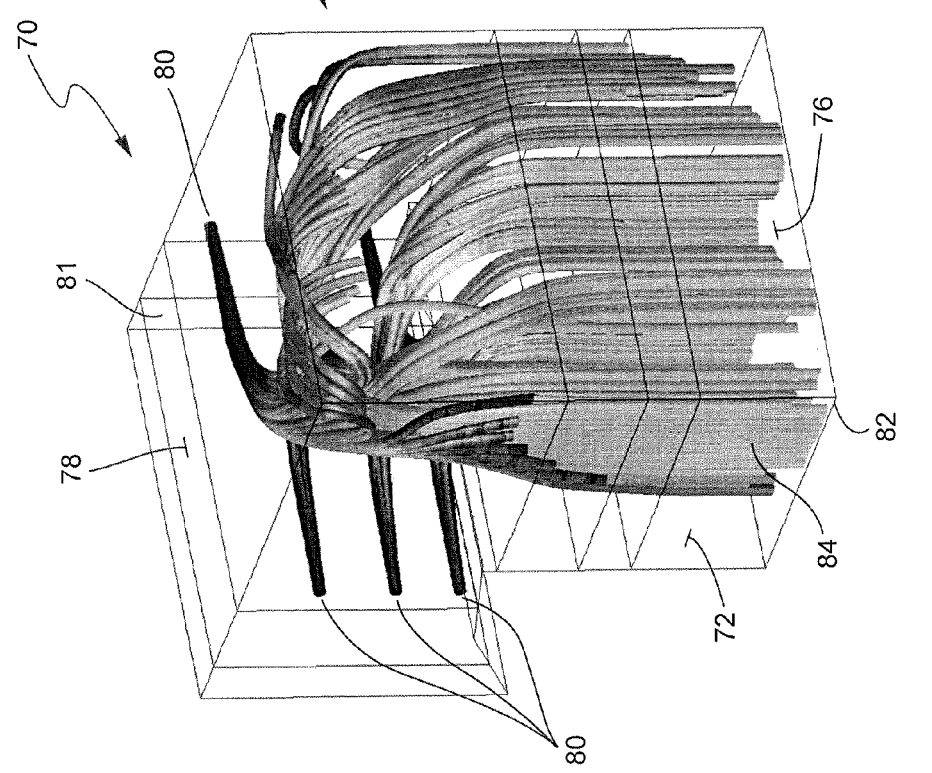

FIGS. 3 and 4 are perspective views of a computer generated model of the injection of steam and reagent into a virtual passage 70 for flue gasses. The virtual model is generated using conventional flow modeling techniques, such as computational fluid dynamics (CFD) software.

The CFD software models the flow of the injected steam and reagent mixture into the virtual passage 70. The passage may be defined by the model to have the sidewalls 72, front wall 74, back wall 76 and top roof 78 with similar dimensions and shapes as does the physical passage 27 for the boiler being modeled.

The virtual nozzles 80 modeled as flow inlets to the passage 70. The CFD software receives input data regarding the position and number of nozzles 80 on the walls 72, 74, 76 and 78, and the inlet flow direction of each nozzle. The CFD software also receives input data or calculates the velocity and amount of flow through each nozzle and the composition of the flow. The CFD software may also, optionally, model or receive inputs of the flue gas flowing through the passage 70 and the distribution remaining reagent in the passage.

The flow model illustrated in FIGS. 2 and 3 show the flow paths of each of the streams injected from the nozzles 80. The modeled flows 84 may be shaded or colored to indicate flow velocity. The flow model provides information in a visual format of the modeled flow 84 of steam and reagent, as well as the flue gas, as the flows move through the passage 70.

The upstream end 81 of the model of the flow passage 70 may correspond to the position in the physical boiler which is immediately downstream of the conductive pass pendants. The downstream end 82 of the model may correspond to the position of the SCR system in the physical passage. The distribution of flows 84 at the position 82 of the SCR system may be used to evaluate the distribution of reagent at the SCR system. The evaluation may determine the extent to which the reagent is uniformly distributed in the passage 70.

The virtual model may be manipulated to achieve a desired reagent flow distribution at the position 82 of the SCR system. The manipulations may be performed manually by a design engineer or automatically by software which optimizes the model. For example, the number and relative of the nozzles 80 may be changed in the model to optimize the flow distribution at the downstream position 82 of the model. Similarly, the placement of nozzles on the walls, e.g., elevations and horizontal position, the selection of walls, e.g., opposite side walls 72, side walls and one or both front and rear walls, front and rear walls only, and on the top cover 78 are possible locations for the nozzles. Other manipulations of the model may include adjusting the throat diameter of the nozzle, the flow inlet angle from each nozzle, and the flow pressure at each nozzle.

FIG. 5 shows computer generated cross-sectional images of the flue gas (with and without the steam and reagent flow) at the position 82 in the passage corresponding to the location of SCR system in the physical passage. The images on the left side of FIG. 5 are of a modeled flow of flue gases for a boiler operating at Full Load and the images on the right side are for a boiler operating at seventy percent (70%) of Full Load. The virtual walls 72, 74 and 76 define the edges of the passage.

The shading of the image shows indicates the uniformity of the flow 84 at the position in the passage of the SCR system. The two images in the top row in FIG. 5 show the modeled flow of flue gas without the injection of a mixture of steam and a reagent. The images in the top row show great contrasts in shading which indicate a highly non-uniform flow of flue gas, and particularly the reagent, passing through the SCR system. The top row images, especially the image for seventy percent Load, indicate that the flue gas has become concentrated in narrow channels in the passage and portions of the passage have near stagnant flow of flue gas. The images in the lower row show the modeled flow of flue gas with the injection of steam and a reagent at the locations shown in FIGS. 4 and 3. The lower row images have starkly less variations in shading as compared to the top row images. The more uniform shading of the lower row images indicates that a generally uniform flow of flue gas is moving through the SCR system.

A comparison of the top and lower row images in FIG. 5 provides a visual indication that injecting steam and a reagent downstream of the SNCR system and possibly downstream of the conductive pass pendants can be used to achieve a uniform flow of flue gas and reagent at the SCR system. The achievement of uniform flow should provide more efficient and complete reduction in the NOx levels as the flue gas passes through the SCR system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus to introduce a reagent to reduce nitrogen oxides in flue gas, the apparatus comprising:
   nozzles mounted to a passage for the flue gas, wherein the nozzles are mounted downstream of a SNCR system and upstream of a SCR system, wherein the nozzles are mounted on at least one wall of the passage and are configured to inject a pressurized fluid into the flue gas;
   a source of the pressurized fluid which is in fluid communication with the nozzles such that the pressurized fluid flows to the nozzles;
   a source of a NOx reducing reagent, and
   a mixing device which mixes the reagent with the pressurized fluid such that the pressurized fluid flowing to the nozzles includes the reagent.

2. The apparatus of claim 1 wherein the source of NOx reducing reagent is a source of at least one of urea and ammonia.

3. The apparatus of claim 1 wherein the nozzles are mounted on opposite sidewalls of the passage.

4. The apparatus of claim 3 wherein the nozzles on each sidewall are vertically aligned.

5. The apparatus of claim 3 wherein the nozzles are arranged in a staggered pattern.

6. The apparatus of claim 3 wherein the nozzles on each sidewall are not in horizontal alignment with the nozzles on the opposite sidewall.

7. The apparatus of claim 1 wherein the source of the pressurized fluid is a source of steam.

8. A boiler having a system to reduce nitrogen oxides in flue gas, the boiler comprising:
   a combustion chamber;
   a passage for flue gas generated in the combustion chamber;
   a SNCR system including at least one injector injecting a nitrogen oxides reducing reagent into the flue gas, wherein the nozzles are mounted to the passage;
   nozzles mounted to the passage downstream of the SNCR system and upstream of a SCR system, wherein the nozzles are mounted on at least one wall of the passage and are configured to inject a pressurized fluid into the flue gas;
   a source of the pressurized gas which is in fluid communication with the nozzles such that the pressurized fluid flows to the nozzles;
   a source of a NOx reducing reagent;
   a mixing device which mixes the reagent with the pressurized gas such that the pressurized gas flowing to the nozzles includes the reagent, and
   the SCR system includes a support structure for a catalyst, wherein the support structure is in the passage and exposes to the flue gas.

9. The apparatus of claim 8 wherein the source of NOx reducing reagent is a source of at least one of urea and ammonia.

10. The apparatus of claim 8 wherein the nozzles are mounted on opposite sidewalls of the passage.

11. The apparatus of claim 10 wherein the nozzles on each sidewall are vertically aligned.

12. The apparatus of claim 10 wherein the nozzles on each sidewall are not in horizontal alignment with the nozzles on the opposite sidewall.

13. A method to reduce airborne nitrogen oxides (NOx) in combustion gas comprising:
   generating combustion gas and directing the flow of combustion gas through a passage;
   reducing the airborne NOx by injecting via a SNCR system a NOx reducing reagent in the combustion gas flowing through the passage, wherein heat energy in the combustion gas promotes a chemical reaction between the reducing reagent and the NOx;
   injecting into the passage, downstream of the injection of the NOx reducing reagent, a mixture of steam and the NOx reducing reagent through an array of nozzles arranged on at least one side of the passage, wherein the mixture is formed upstream of the array of nozzles and distributed to the array of nozzles, and
   further reducing the airborne NOx in the combustion gas by using a catalyst to promoting a reaction between combustion gas and the NOx reducing reagent injected with the steam.

14. The method of claim 13 wherein the first reducing step injects the NOx reducing reagent into the combustion gas, while the gas is at a temperature of at least 1500 degrees Fahrenheit (815 degrees Celsius).

15. The method of claim 13 wherein the further reducing step is performed while the combustion gas is at a temperature below 1200 degrees Fahrenheit (650 degrees Celsius) as the gas flows over the catalyst.

16. The method of claim 13 wherein the combustion gas is flue gas flowing through a flue gas duct in a boiler, and the method further comprises transferring heat energy from the combustion gas by passing the combustion gas through a conductive pass pendants in the flue gas duct downstream of the injection of the NOx reducing reagent.

17. The method of claim 13 wherein the injection of the mixture of steam and the NOx reducing reagent is through nozzles that are mounted on opposite sidewalls of the passage.

18. The method of claim 13 wherein in the reducing step the introduced NOx reducing reagent is substantially completely reacted by the heat energy and NOx.

19. The method of claim 13 wherein in the first reducing step a portion of the introduced NOx reducing reagent remains unreacted by the heat energy and flows to be used in the further reducing step.

20. The method of claim 13 wherein the NOx reducing reagent used in the further reducing step is substantially completely the reagent included with the injected steam.

21. The method of claim 13 wherein the mixture of steam and the NOx reducing reagent is injected at a velocity of at least Mach 0.5.

22. The method of claim 13 wherein a total flow rate of the mixture of steam and the NOx reducing reagent is no greater than one percent of the total flow rate of the combustion gas.

* * * * *